Patented July 24, 1934

1,967,345

UNITED STATES PATENT OFFICE 1,967,345

AZO COLORING MATERIAL

Fritz Ballauf and Albert Schmelzer, Cologne-Mulheim, Germany, assignors to General Aniline Works, Inc., New York, N. Y., a corporation of Delaware No Drawing. Application April 20, 1932, Serial No. 606,515. In Germany April 25, 1931

12 Claims. (Cl. 260—86)

The present invention relates to coloring materials and to materials colored therewith, more particularly it relates to coloring materials which may be represented by the probable general formula:

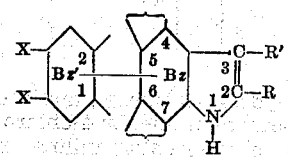

wherein the benzene nucleus "Bz'" is attached by the positions 1 and 2 to the benzene nucleus "Bz" in an α-β-position, "R" and "R'" stand for hydrocarbon radicals of the aliphatic, aromatic or aliphatic-aromatic series, for example, for methyl, ethyl, phenyl and benzyl, one X stands for the hydroxy group and the other X stands for the radical of a diazo compound suitable for producing an azodyestuff free from a group inducing solubility in water, such as a sulfonic acid and carboxylic acid group, said radical of a diazo compond being attached to the benzene nucleus "Bz'" by the azo-bridge.

The types of coloring materials falling within the scope of the above general formula are as follows:

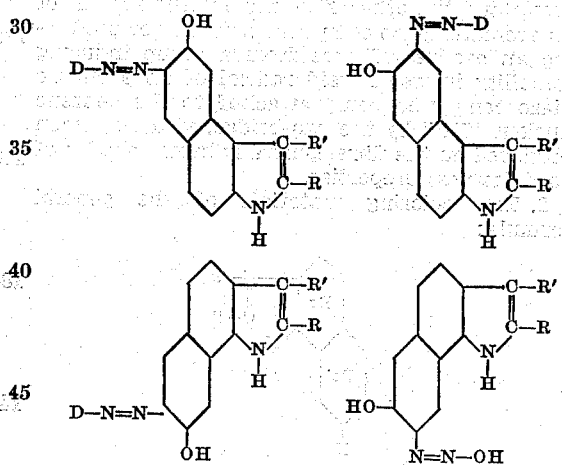

wherein the figures "R" and "R'" mean the same as stated above, and "D" stands for the radical of a diazotization component suitable for producing azodyestuffs free from a group inducing solubility in water, that means "D" stands for an aromatic or heterocyclic nucleus, such as a benzene, naphthalene, diphenylene-oxide, carbazole nucleus which may bear substituents, such as alkyl, alkoxy, the nitro group and halogen.

The coupling components of the benzindole series used in our invention are obtainable for example from the corresponding benzindole sulfonic acids by alkali fusion. The benzindole sulfonic acids again can be prepared according to known methods, for example, by transforming the hydrazines of the corresponding naphthylamino-sulfonic acids, that are 1- or 2-naphthalene-6- or 7-sulfonic acid, into ketone hydrazones by means of a suitable ketone, such as acetone, diethyl-ketone, ethyl-methyl ketone, acetophenone, ethyl-phenyl ketone, and effecting the synthesis of the indole by heating with an acid condensing agent. The 2.3-diphenyl-hydroxy-benzindoles suitable for our invention have been described in our U. S. Patent No. 1,906,221, dated September 30, 1932.

Our new coloring materials are obtainable according to known methods by diazotizing a primary amine suitable for producing an azodyestuff free from a group inducing solubility in water and coupling in substance or on the fibre with a hydroxy-benzindole of the general formula:

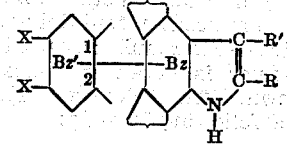

wherein the benzene nucleus "Bz'" is attached by the positions 1 and 2 to the benzene nucleus "Bz" in an α-β-position, wherein the figures "R" and "R'" mean the same as stated above, and wherein one X stands for a hydroxy group and the other X stands for hydrogen, said process being more fully described in the following examples.

Our new coloring materials are generally blackish-brown powders, yielding, when produced on the fibre, generally brown shades of good fastness properties.

The invention is illustrated by the following examples, without being limited thereto:

*Example 1.*—Well boiled and dried cotton is impregnated with a solution of 5 grams of 8-hydroxy-2-phenyl-α-naphthindole, 10 ccs. of 34° Bé. caustic soda and 10 ccs. of Turkey red oil per litre, wrung out and developed without the necessity of drying in a diazo solution neutralized with sodium acetate and containing 1.7 grams per litre of 2.5-dichloroaniline, rinsed and soaped. In this manner is obtained a beautiful, fast reddish brown. The coloring material corresponds to the following formula:

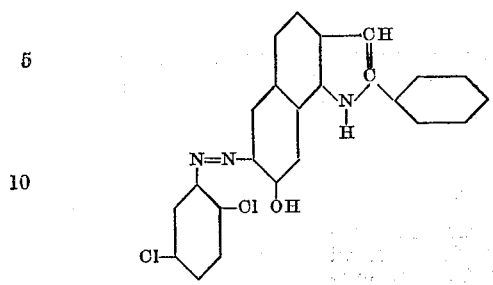

The following list gives several further combinations, obtainable in a manner analogous to that described in the above example together with the corresponding shades:—

8 - hydroxy - 2 - phenyl-α-naphthindole yields with:

2-chloroaniline _____ a reddish brown with a yellowish tinge
2-methyl-5-chloroaniline _____ a reddish violet
4-chloro-2-nitraniline _____ a deep reddish brown
α-naphthylamine _____ a deep reddish brown Similar shades are obtained when using instead of 8-hydroxy-2-phenyl-α-naphthindole the corresponding 8-hydroxy-2-phenyl-β-naphthindole.

*Example 2.*—3,5 grams of 8-hydroxy-2-phenyl-α-naphthindole are dissolved in water with the addition of caustic soda, and to this solution there is added a diazo solution prepared in the usual manner from 1,5 grams of 2.5-dichloroaniline. On rendering the reaction of the solution acetic acid by the addition of sodium acetate coupling enters and the coloring material which is identical with that described in Example 1, paragraph 1, precipitates. It is filtered and dried and represents a valuable pigment.

*Example 3.*—Well boiled and dried cotton is impregnated with a solution of 5 grams of 8-hydroxy-2.3-dimethyl-α-naphthindole, 10 ccs. of 34° Bé. caustic soda and 10 ccs. of Turkey red oil per litre, wrung out and developed without the necessity of drying, in a diazo solution, neutralized by means of sodium acetate, containing 2 grams per litre of 2-nitro-4-chloroaniline, rinsed and soaped. In this manner is obtained a beautiful dark reddish brown. The coloring material corresponds to the following formula:

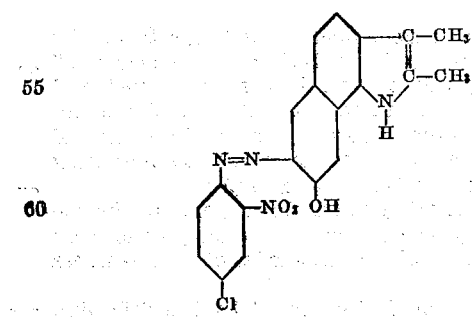

The following list gives several further combinations obtainable in a manner analogous to that described in the above example together with the corresponding shades:

8 - hydroxy - 2.3 - dimethyl - α - naphthindole yields, for example, with:

2-methyl-4-nitraniline __ a dark brown of a violet tinge
2-methyl-4-chloroaniline __ a dark reddish brown Similar shades can be obtained, for example, from 8-hydroxy-2.3-methylethyl-α-naphthindole and 8-hydroxy-2.3-diphenyl-α-naphthindole.

*Example 4.*—Well boiled and dried cotton is impregnated with a solution of 5 grams of 7-hydroxy-2.3-dimethylnaphthindole, 10 ccs. of 34° Bé. caustic soda lye and 10 ccs. of Turkey red oil per litre, wrung out and developed, without the necessity of drying, in a diazo solution, neutralized by means of sodium acetate, containing 1.7 grams per litre of 2.5-dichloroaniline, rinsed and soaped. In this manner a beautiful, dark reddish brown is obtained. The coloring material corresponds to the following formula:

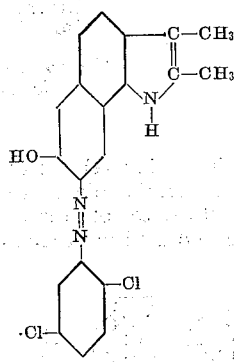

From 7-hydroxy-2-phenylnaphthindole and diazotized 2-chloroaniline, or 4-chloro-2-nitraniline, or 2-methyl-5-chloroaniline respectively somewhat more yellowish shades are obtained.

We claim:

1. The coloring materials of the general formula:

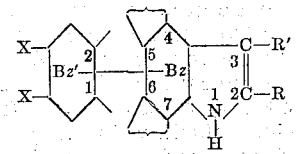

wherein the benzene nucleus "Bz'" is attached by the positions 1 and 2 to the benzene nucleus "Bz" in an α-β-position, "R" and "R'" stand for hydrocarbon radicals of the aliphatic, phenyl or benzyl series, one X stands for the hydroxy group and the other X stands for the radical of an aromatic diazo compound suitable for producing an azodyestuff free from a group inducing solubility in water, said radical of an aromatic diazo compound being attached to the benzene nucleus "Bz'" by the azo-bridge, yielding, when produced on the fibre, generally brown shades of good fastness properties.

2. The coloring materials of the general formula:

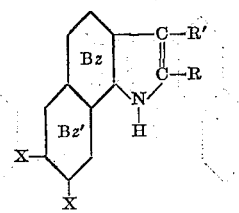

wherein "R" and "R'" stand for hydrocarbon radicals of the aliphatic, phenyl or benzyl series, one X stands for the hydroxy group and the other X stands for the radical of an aromatic diazo compound suitable for producing an azodyestuff free from a group inducing solubility in water, said radical of an aromatic diazo compound being attached to the benzene nucleus "Bz'" by the azo-bridge, yielding, when produced on the fibre, generally brown shades of good fastness properties.

3. The coloring materials of the general formula:

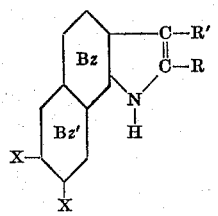

wherein "R" and "R'" stand for hydrocarbon radicals of the aliphatic, phenyl or benzyl series, one X stands for the hydroxy group and the other X stands for the radical of an aromatic diazo compound of the benzene or naphthalene series in which the nuclei may be substituted by substituents selected from the group consisting of halogen, alkyl, alkoxy and the nitro group, said radical of an aromatic diazo compound being attached to the benzene nucleus "Bz'" by the azo-bridge, yielding, when produced on the fibre, generally brown shades of good fastness properties.

4. The coloring materials of the general formula:

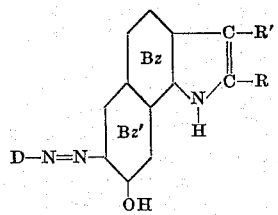

wherein "R" and "R'" stand for hydrocarbon radicals of the aliphatic, phenyl or benzyl series, "D" stands for a benzene or naphthalene nucleus which may be substituted by substituents selected from the group consisting of halogen, alkyl, alkoxy and the nitro group, yielding, when produced on the fibre, generally brown shades of good fastness properties.

5. The coloring material of the following formula:

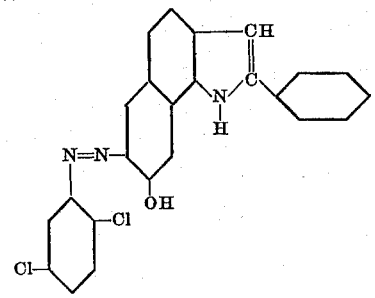

yielding, when produced on the fibre, reddish brown shades of good fastness properties.

6. The coloring material of the following formula:

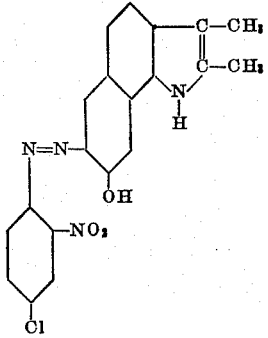

yielding, when produced on the fibre, dark reddish brown shades of good fastness properties.

7. Fibre colored with the coloring materials as claimed in claim 1.
8. Fibre colored with the coloring materials as claimed in claim 2.
9. Fibre colored with the coloring materials as claimed in claim 3.
10. Fibre colored with the coloring materials as claimed in claim 4.
11. Fibre colored with the coloring material as claimed in claim 5.
12. Fibre colored with the coloring material as claimed in claim 6.

FRITZ BALLAUF.
ALBERT SCHMELZER.